(12) United States Patent
Goebel et al.

(10) Patent No.: US 9,314,877 B2
(45) Date of Patent: Apr. 19, 2016

(54) ASSEMBLY AND METHOD FOR DETECTING RADIATION

(75) Inventors: Klaus R. Goebel, Darmstadt (DE); Matthias Miessen, Eschweiler (DE)

(73) Assignees: REIS GROUP HOLDING GMBH & CO. KG, Obernburg (DE); INGENIEURBURO GOEBEL GMBH, Darmstadt (DE)

( * ) Notice: Subject to any disclaimer, the term of this patent is extended or adjusted under 35 U.S.C. 154(b) by 658 days.

(21) Appl. No.: 13/575,382

(22) PCT Filed: Jan. 20, 2011

(86) PCT No.: PCT/EP2011/050768
§ 371 (c)(1),
(2), (4) Date: Aug. 17, 2012

(87) PCT Pub. No.: WO2011/092110
PCT Pub. Date: Aug. 4, 2011

(65) Prior Publication Data
US 2012/0312970 A1    Dec. 13, 2012

(30) Foreign Application Priority Data
Jan. 27, 2010   (DE) .......................... 10 2010 000 227

(51) Int. Cl.
| | |
|---|---|
| B23K 26/40 | (2014.01) |
| B23K 26/30 | (2014.01) |
| F16P 1/02 | (2006.01) |
| F16P 1/06 | (2006.01) |

(52) U.S. Cl.
CPC ............ *B23K 26/422* (2013.01); *B23K 26/427* (2013.01); *B23K 26/702* (2015.10); *B23K 26/706* (2015.10); *F16P 1/02* (2013.01); *F16P 1/06* (2013.01)

(58) Field of Classification Search
USPC ....................................... 250/338.1
See application file for complete search history.

(56) References Cited

U.S. PATENT DOCUMENTS

| | | | | |
|---|---|---|---|---|
| 5,587,847 | A  * | 12/1996 | Chang et al. .................. | 359/890 |
| 6,518,586 | B1 | 2/2003 | Heberer | |
| 7,081,295 | B2 * | 7/2006 | James et al. .................. | 428/327 |
| 7,432,489 | B2 * | 10/2008 | Pileri et al. .................... | 250/205 |
| 2007/0023406 | A1 | 2/2007 | Heberer | |

(Continued)

FOREIGN PATENT DOCUMENTS

| | | |
|---|---|---|
| DE | 36 38 874 | 5/1987 |
| DE | 89 08 806 | 8/1989 |

(Continued)

*Primary Examiner* — Christine Sung
(74) *Attorney, Agent, or Firm* — Ladas & Parry LLP

(57) ABSTRACT

The invention relates to an assembly and method for detecting laser radiation which hits a disc (20, 28) sealing an opening (16, 18) of an enclosure, wherein at least one sensor (22) detecting the radiation is aligned having the radiation sensitive region (24) thereof on a circumferential edge section (26) of the disc, which is designed to be radiation-conducting. In order to enable secure monitoring both of the disc and of the enclosure, without a plurality of sensors being required, according to the invention, the enclosure has two walls (12, 14) spaced apart from each other and having openings (16, 18) which are sealed by the disc (20), the disc (20, 28) is arranged between the walls at the edge and the sensor (22) is arranged having the sensitive region (24) thereof between the walls, spaced apart from the disc or within an opening of the disc.

21 Claims, 10 Drawing Sheets

(56) References Cited

U.S. PATENT DOCUMENTS

2008/0112447 A1* 5/2008 Wilhelmi et al. .......... 372/38.09
2011/0260737 A1* 10/2011 Hannweber et al. .......... 324/649

FOREIGN PATENT DOCUMENTS

| | | |
|---|---|---|
| DE | 199 40 476 | 4/2001 |
| DE | 100 17 284 | 6/2001 |
| DE | 20 2007 006 710 | 8/2007 |
| DE | 10 2006 036 500 | 2/2008 |
| DE | WO 2009019020 A1 * 2/2009 ........... B23K 26/427 |
| EP | 0 321 965 | 6/1989 |
| EP | 1 746 334 | 1/2007 |
| EP | 2 119 531 | 11/2009 |
| EP | 2119531 A1 * | 11/2009 |
| GB | 2 171 513 | 8/1986 |
| GB | 2 182 746 | 5/1987 |

* cited by examiner

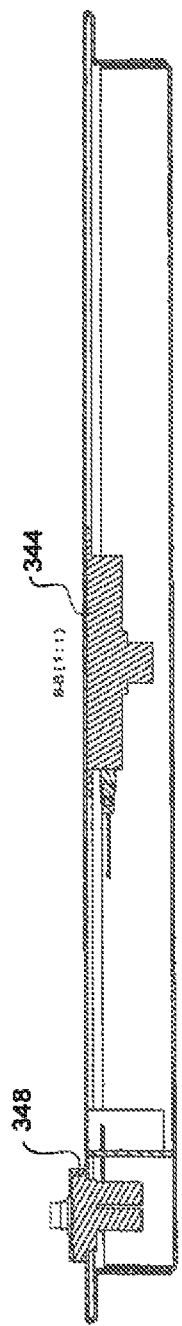
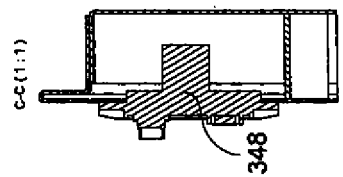

ASSEMBLY AND METHOD FOR DETECTING RADIATION

This application is a 371 of PCT/FR2011/050768, filed on Jan. 20, 2011, which claims priority to German patent application No. 10 2010 000 227.5, filed on Jan. 27, 2010, the contents of which are incorporated herein by reference.

The invention relates to an arrangement for detecting radiation, in particular in the wavelength region between 350 nm and 1,800 nm, preferably laser radiation incident upon a wafer-like, at least semi-transparent first element that seals an opening of a protective device, such as the enclosure of a protective wall system. The invention further relates to a method for detecting radiation, in particular hazardous radiation such as laser radiation, which is generated by means of a radiation source in an area that is shielded by a protective wall system, whereby an opening in the protective wall system is sealed by an at least semi-transparent pane.

In particular, the invention relates to an arrangement for detecting radiation, in particular in the IR region, preferably laser radiation, which is incident upon a wafer-like, at least semi-transparent first element that comprises a circumferential edge and seals the opening of a protective device, such as the enclosure of a protective wall system, whereby at least one radiation-detecting sensor is aimed with its beam-receiving section towards a section of the circumferential edge of the first element, which is embodied to be radiation-conducting and whereby a preferably radiation-absorbing second element possibly extends on the outside of the first element.

A further subject matter of the invention is a method for detecting in particular hazardous radiation, such as laser radiation, which is generated by means of a radiation source in an area that is shielded by a protective wall system, whereby an opening in the protective wall system is sealed by an at least semi-transparent pane, and in the event of incidence of hazardous radiation this radiation is conducted across the pane in the direction of at least one sensor, which is arranged in the circumferential area, detects hazardous radiation, and in the event of the detection of hazardous radiation is used to switch off the radiation source.

Modern high-power lasers are used for the processing of material in industrial manufacturing. Gantry-type systems and robot systems allow maximum flexibility for the operator in guiding the laser radiation to the work piece. Guiding the laser energy to the processing location by means of waveguides significantly increases the dynamic performance of these systems. For personnel safety reasons, passive (absorbing) protective walls, usually made of metal, with single or multiple spaced plates, are arranged around the laser region, so-called shielding enclosures. The incidence of laser radiation within these protective walls is of extremely high intensity.

In addition, uncontrolled reflections occur during the processing of work pieces. Direct or indirect laser radiation, in a worst-case scenario the raw beam or even the focussed laser beam, is incident upon the shielding enclosure, which is tasked with providing protection against the radiation for personnel on the outside. Depending on the particular operating mode of the laser system, this protection must be provided for a time period t, for example until the operator of the system notices the error and can shut down the system. Because of the high laser power and the often small distances to the protective walls, this particular time period t until shut-off is becoming shorter and shorter or in other words the requirements on the material of the enclosure to realize the protective time period are becoming more and more demanding. Consequently, protective walls with exclusively passive protection are of only limited use in protecting personnel.

DE-C-100 17 284, DE-A-103 25 906, and DE-C-196 29 037 relate to passive protection against laser radiation by means of various embodiments of the surface characteristics or spacing of the walls.

Various thermal conductivity characteristics or the reflectivity are used to realize the passive radiation protection. However, in practical application, the surfaces of the protective walls will be contaminated by oil, debris, and dust after a short time period to such a degree that the original characteristics of the protective devices can no longer be taken for granted.

The subject matter of DE-C-36 38 874 is an active method, whereby the interior wall facing a laser is equipped with an electrically active conductor, similar to a fusible cutout. In this method, a reliable function is only guaranteed if the absorptive characteristics of the interior wall are precisely tuned to the laser wavelength and if the interior wall additionally contains an electrically active fuse. In order to be able to employ this system for fibre lasers, for example, with very small beam diameters, it would be necessary to embed the electrical conductor into the wall in a very tight serpentine pattern, which would result in high constructive and monetary costs. An arrangement of this type is described in DE-U-89 08 806.

An active arrangement for the detection of optical radiation by means of arbitrary sensors is disclosed in DE-A-199 40 476. The design of a protective wall is an essential component of its functionality. The use of thermal sensors on the wall facing the laser requires, depending on the thermal conductivity of the wall material, a not insignificant number of sensors to guarantee a reliable shut-down.

EP-B-0 321 965 discloses an arrangement and a method for the detection of laser radiation that is emitted from a processing area. For this purpose, the processing area is surrounded by a wall in which is arranged a detector that measures the illumination created on the wall by the incident laser radiation. A photo emitter is provided for monitoring the sensor, whereby the radiation emitted is received by the sensor to monitor the latter's function.

A protective system for monitoring laser radiation is disclosed in GB-A-2 171 513. The laser beam is detected by means of a receiver. An infrared light source is provided for purposes of monitoring the receiver and the receiver detects the radiation emitted by the light source.

Also known in the art is a protective wall system of a laser cabin, which comprises an opening that is sealed by a disk consisting of polycarbonate (Macrolon®). In the event of incidence of laser radiation, this disk melts. The disk possesses a thickness that ensures that sufficient time is available starting from the beginning of the melting to shut down the laser source. This consequently is a passive system. The safety protection hereby is exclusively suitable for lasers that emit radiation in the far infrared region, i.e. for $CO_2$ lasers, for example.

DE-B-10 2008 024 068 discloses a class-defining laser protection device with a laser protection window, that is encompassed by a frame with a U-shaped cross-section. On the front window face is arranged a detector unit for the detection of secondary radiation that is generated by laser radiation reaching the protective window. The laser protection window itself is embodied as a sheet composite comprising one safety pane absorbing the laser beam and arranged in parallel thereto a second pane that absorbs laser radiation to a lesser degree than the safety pane and guides the secondary radiation to the detector unit. The safety pane, which absorbs more radiation, is arranged on the side of the radiation-guiding pane that faces away from the laser source.

The exclusive task of the detector unit is the detection of radiation incident upon the pane; the space between the frame and the pane is not being monitored. Any areas of the laser protection device that are outside of the laser protection window must be monitored by separate sensors.

The objective of the present invention is to further develop an arrangement as well as a method of the above-mentioned type in a way so as to facilitate a reliable monitoring of both the radiation-conducting first element and the protective device, without creating the need for a multitude of sensors.

A further development of the invention is to allow the installation of the first element with uncomplicated constructive measures, whereby in particular a retrofit into sliding doors is to be facilitated.

To meet this objective, it is fundamentally proposed that the protective device comprise two walls—with openings—that are separated from each other by a distance, and that the openings be sealed by the first element, that the first element be arranged along its edge between the walls, in particular without a frame, and that the sensor with its detection area be arranged between the walls, at some distance from the circumferential edge section, or on the circumferential edge section, or within a through opening of the first element.

According to the invention, the first element—to be referred to as active window or pane—is directly integrated into the protective device in such a way that the latter provides support for the edge of the pane. No additional frame is required. This simultaneously creates the option of monitoring with only one sensor both the—hereinafter referred to as pane for simplicity—first element and at least partially the adjoining space between the walls. Consequently, the number of sensors required to provide complete monitoring of the protective device can be reduced.

In particular it is intended that monitoring take place via at least two sensors in a plane wall element—that also contains the pane—of the protective device, which comprises the two spaced apart walls, in such a way that two sensors are diametrically opposed to the pane along an extension of a diagonal of the disk or that one sensor is arranged in the region of each longitudinal edge of the pane.

An arrangement along the longitudinal edges is also sufficient to facilitate monitoring both the pane as well as the space of the protective device extending outside of the pane, as long as the pane is sufficiently conductive for hazardous radiation penetrating outside of the pane, i.e. attenuates the radiation to an insignificant degree.

Otherwise the pane could act as shading for the radiation penetrating into the protective device outside of the pane. In order to provide adequate monitoring in this case as well, at least two sensors are arranged diametrically opposed to the pane and along a diagonal, so that shading can not occur in this case.

However it is also possible to embody the radiation-conducting pane in a double-layered manner, whereby one layer conducts the radiation incident upon the pane and contains scattering points formed by nano-particles that scatter the radiation, so that the radiation can be conducted to the sensor(s), whereas the other layer does not contain any corresponding scattering points, so that radiation incident upon the lateral edges of the layer can be conducted to the sensor or sensors with extremely low attenuation.

In particular it is intended that the element at least on the beam-incident side consist of a radiation-absorbing second material or comprise a layer of this material. An alternative option is that associated with the first element on its radiation-facing side is a second element made of a material that is radiation-absorbing or reflects independent of angle, such as a filter or type of mirror, which can be connected to the first element or can be arranged with some spacing relative to the latter.

The second material or second element should absorb or reflect scattered radiation that is generated in the hazardous area to be shielded, in particular to a degree that ensures that the sensor is not triggered and consequently the radiation source is not shut down, but at the same time it should transmit at least a portion of the visible spectrum that does not contain the wavelength of the hazardous radiation.

The second material in particular is a material that is used to filter the radiation, thus providing optical protection for personnel during any observation of the area shielded by the protective device.

According to the invention one utilizes the radiation or light-guiding characteristics of the first material to be able to detect any radiation, such as scattered radiation, in particular laser radiation entering into the element.

When hazardous radiation of this type is incident upon the second or first element, the element is damaged, i.e. the structure of the element changes in a way so that scattered radiation is generated, which is guided to the sensor by means of the first element on account of the radiation- or light-guiding characteristics, i.e. the resulting total reflection or scattering by particles, such as nano-particles, present in the first element. This results in an extremely rapid response, so that personnel located outside of the area will be reliably protected by a rapid shutdown of the radiation source.

The absorbing or reflecting second material or element absorbs or reflects the radiation being created in the hazardous area. As a result of this, the radiation-absorbing or reflecting material, i.e. the filter or an element providing the function of a mirror, will be destroyed if the intensity exceeds a particular limit. This may occur via melting, burning, or bursting. Subsequently the radiation encounters the light-conducting first material, which preferably consists of acrylic glass, and is conducted further to the edges. One or several sensors arranged on the edges subsequently detect the radiation such as laser radiation and switch off the radiation source.

In further development of the invention it is intended that the first element be embodied on its outside, i.e. on its side that faces away from the radiation source, to be radiation absorbing or reflecting or to be equipped with a corresponding third material.

The third material is necessary on principle, since the first material, such as the acrylic glass pane, conducts the radiation energy, such as the laser energy only partially in the direction of the edges, so that consequently the passing radiation must be absorbed or reflected in order to protect the observer. The absorption in the third material or the reflection by the third material must take place in such as way that the radiation source will have been shut down by the sensor before the radiation has a chance to pass through the third material.

The second and third materials, which form a radiation protective filter, such as a laser protective filter, should be tuned precisely to the wavelength of the employed radiation system such as laser system.

It should also be ensured that the system comprising the first element and the one or several elements or layers—also to be referred to as 'active protective window'—that absorb or reflect the radiation, be installed into the protective device in a light-tight manner in order to prevent scattered radiation or sunlight from reaching the sensor directly.

Independently of whether the opening is sealed by a sandwich system of wafer-like elements or a single element, this provides an active system to switch off hazardous radiation such as laser radiation.

The invention's teaching can also be applied to already existing protective systems. For this it is only necessary to introduce a corresponding opening into the protective wall, to close this opening in accordance with the invention's teaching with one or several element(s) possessing the above-described characteristics, and to arrange a detector in the region of a section of the circumferential area.

As further development of the invention it is intended that the pane with the first material or the first, second, third material or with the filter(s) extend over the entire surface of a wall forming the boundary of a protective device, i.e. substitutes for the latter, providing an unobstructed view into the entire hazardous area in which the radiation source is located.

Radiation penetrating directly into the protective device, i.e. penetrating outside the pane, may also be guided to detectors along a pane containing scattering points, if the pane at least on the side facing the radiation source or on the side facing away from the radiation source possesses a further layer or a filter, which is referred to as second or third element and which absorbs radiation, in particular in the case if between the first element, i.e. the pane, and the second and/or third element extends an air gap or for example an adhesive with a refractive index that is low compared to that of the first element.

Now radiation penetrating the protective device can reach the sensor via this route. Thus it is ensured that shading of the radiation by the pane can not take place even if the latter contains scattering points generated by nano-particles during manufacture.

A method for the detection of in particular hazardous radiation, such as laser radiation, which is generated by means of a radiation source in an area that is shielded by a protective wall system, whereby an opening in the protective wall system is sealed by an at least semi-transparent pane, and upon incidence of hazardous radiation this radiation is conducted across the pane in the direction of a sensor, which is arranged in the circumferential area, detects the hazardous radiation, and is used to switch off the radiation source upon the detection of hazardous radiation, is characterized in that the employed protective wall system comprises two spaced-apart walls with openings that are closed by the pane, in that as material for the pane or for an element associated with the pane on the radiation-generating side one uses a material that upon incidence of hazardous radiation scatters this radiation, and in that both radiation conducted through the pane and radiation penetrating into the protective wall system outside the pane are detected by means of the one sensor.

For the purpose of providing optical protection for personnel observing the shielded area via the first element it is further intended that assigned to the first element on its side that faces the radiation source be a filter or reflector, which can be a part of the first element or a separate element.

Alternatively or additionally, an area of the first element facing away from the radiation source may be embodied as a filter or a reflector, or a filter or reflector may be associated with the first element.

A filter preferably is present at least on the side of the first element facing away from the radiation source, in order to ensure that the radiation passing through the first element can not harm the observer, whereby the absorption of the third material or filter should be designed in such a way that the reaction time of the sensor for shutting down the radiation source will be taken into account when hazardous radiation is incident upon the active disk. Alternatively, the third material may be a material with angle-independent radiation reflection.

Independently hereof it is intended that a radiation source be used that emits radiation in the wavelength region between 350 nm and 1800 nm. In particular, the wavelength region is between 800 nm and 1800 nm. It is preferable for the radiation source to emit radiation in the near infrared region (near IR).

Further details, advantages, and features of the invention are not only found in the claims, the characteristic features listed therein—either on their own or in combination—but also in the following description of preferred embodiment examples illustrated in the figure.

Figure 4:
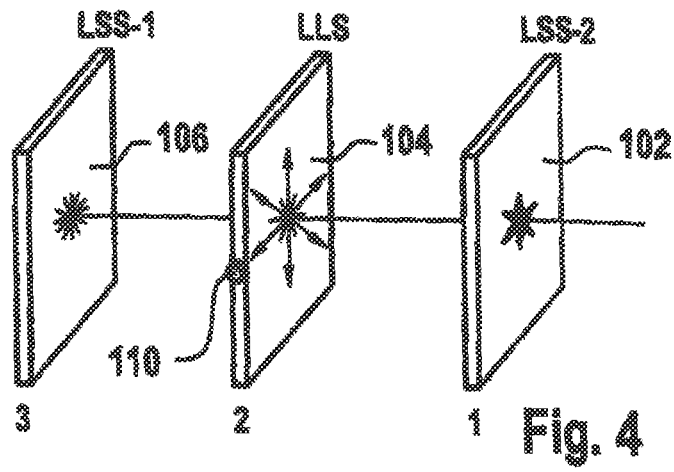
Figure 5:
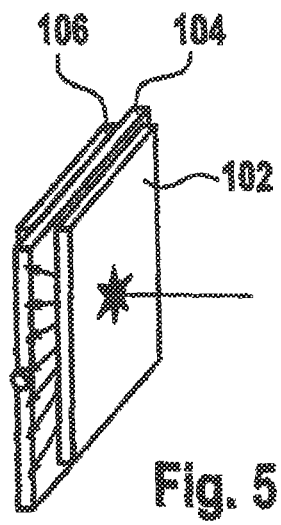
Figure 6:
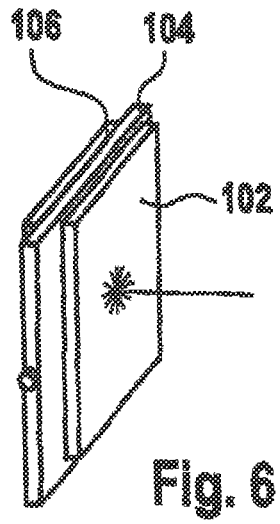
Figure 7:
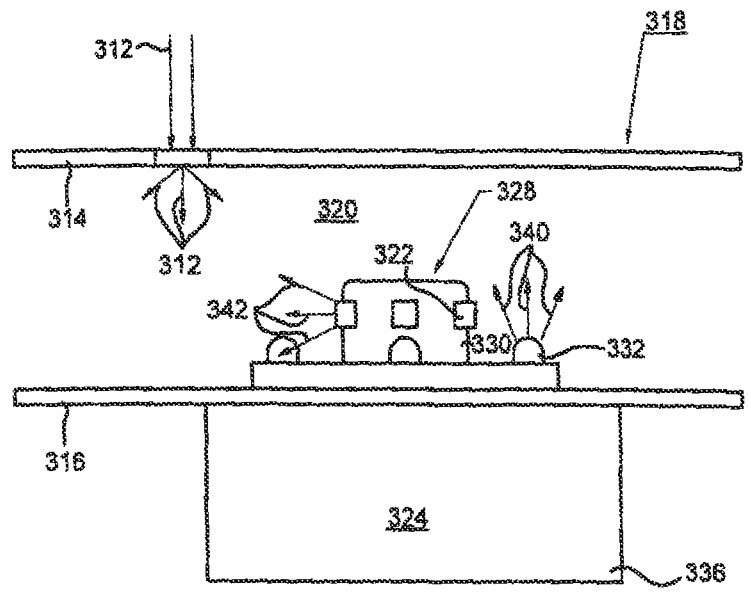
Figure 8:
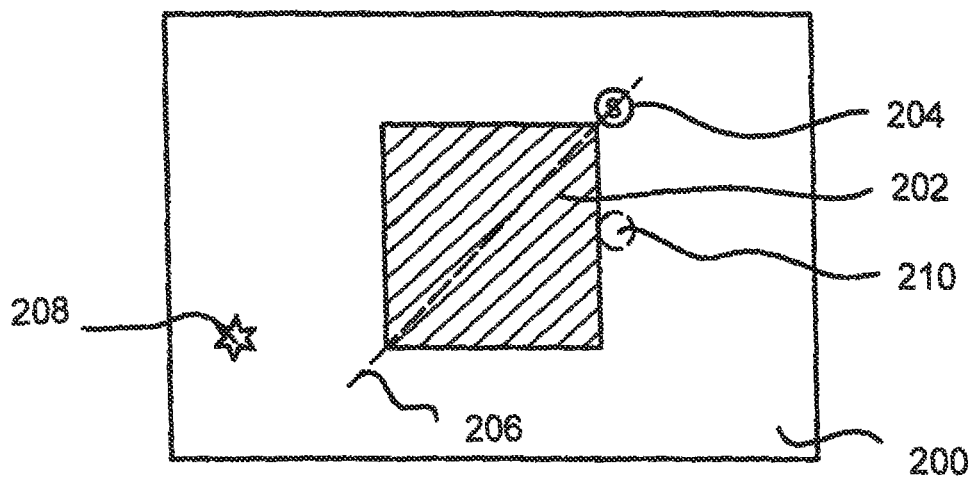
Figure 9:
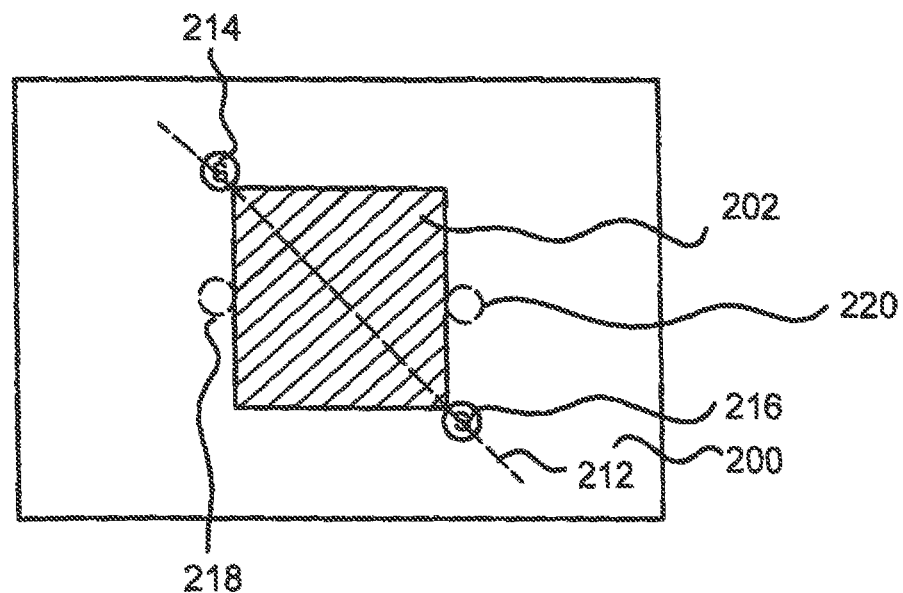
Figure 10:
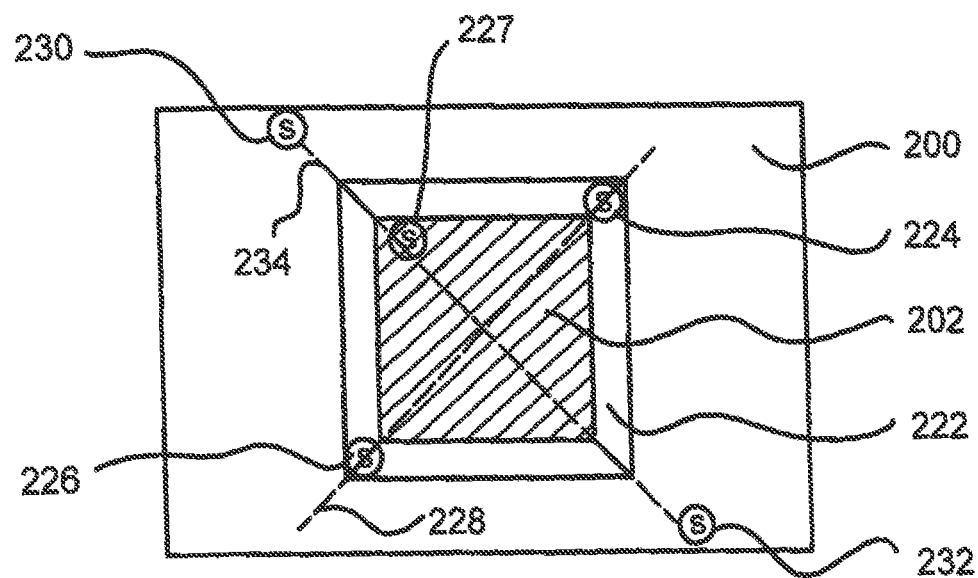
Figure 11:
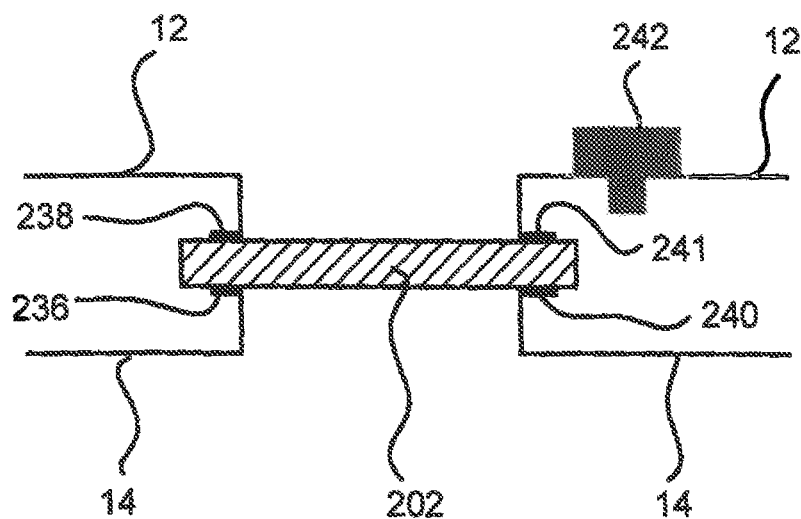
Figure 12:
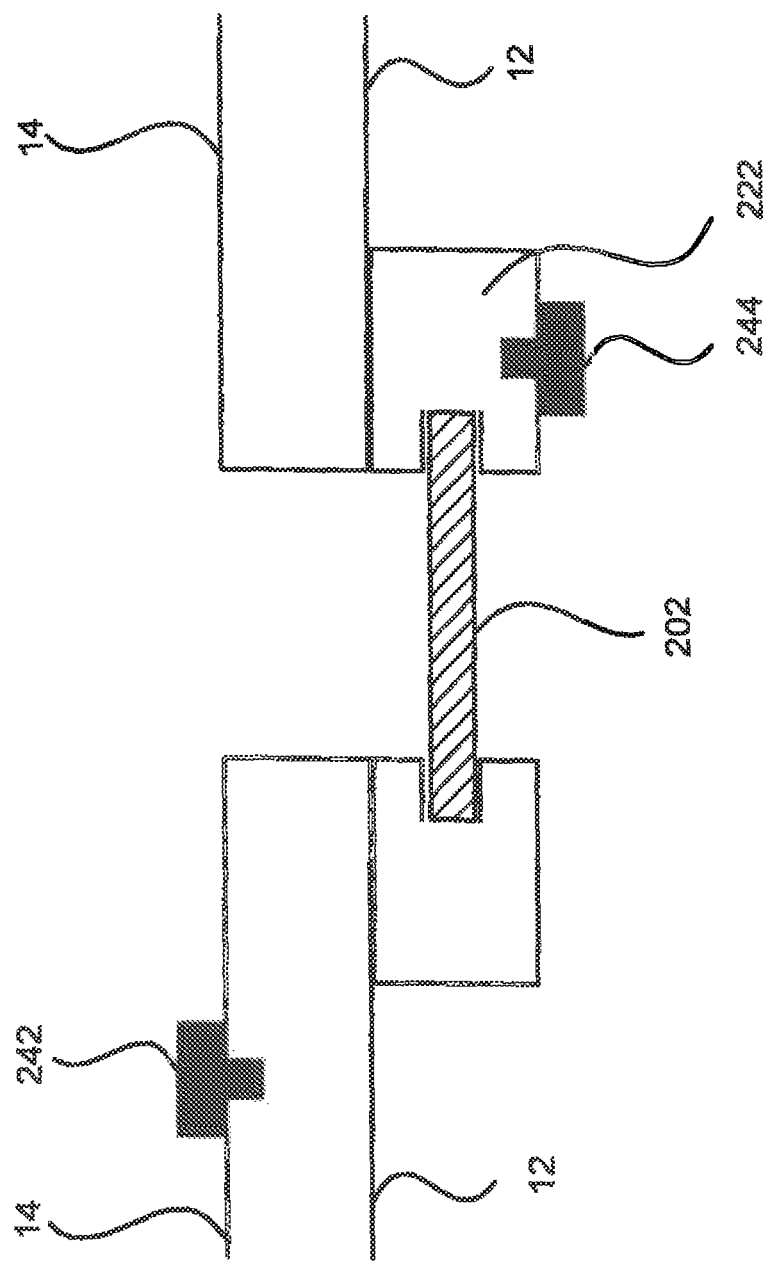

FIG. 4 shows a schematic illustration of the method of functioning of a radiation protection window, FIG. 5 shows a further schematic illustration of the radiation protection window to explain a first function, FIG. 6 shows the radiation protection window to illustrate a second function, FIG. 7 shows a section of a protective device comprising one wall and one sensor, FIG. 8 shows a wall of a protective device with radiation protection window with a first arrangement of sensors, FIG. 9 shows the wall of a protective device in accordance with FIG. 8 with a second arrangement of sensors, FIG. 10 shows the wall of a protective device in accordance with FIG. 8 with a further embodiment variant of a radiation protection window, FIG. 11 shows a cross-sectional view of a section of a protective wall with a radiation protection window, FIG. 12 shows a cross-section of a section of a further embodiment variant of the protective device with a radiation protection window.

Figure 13:
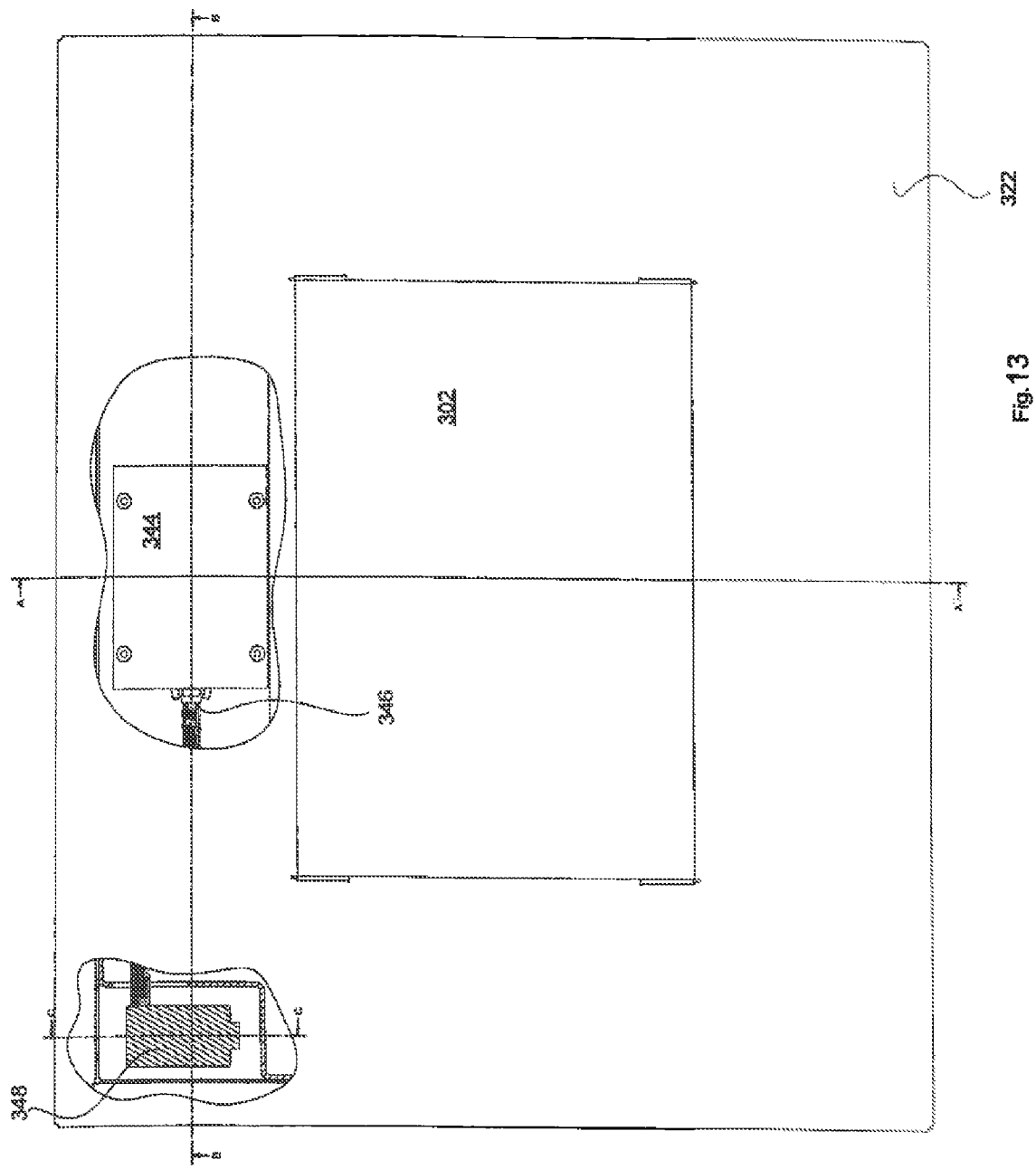
Figure 14:
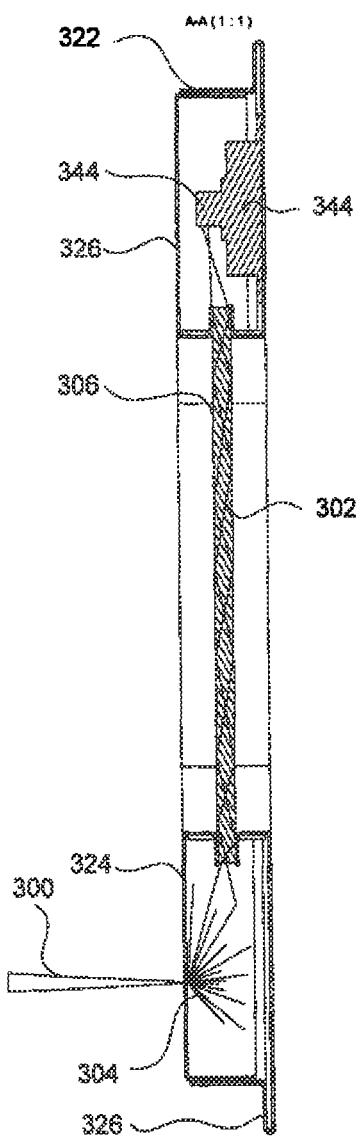
Figure 18:
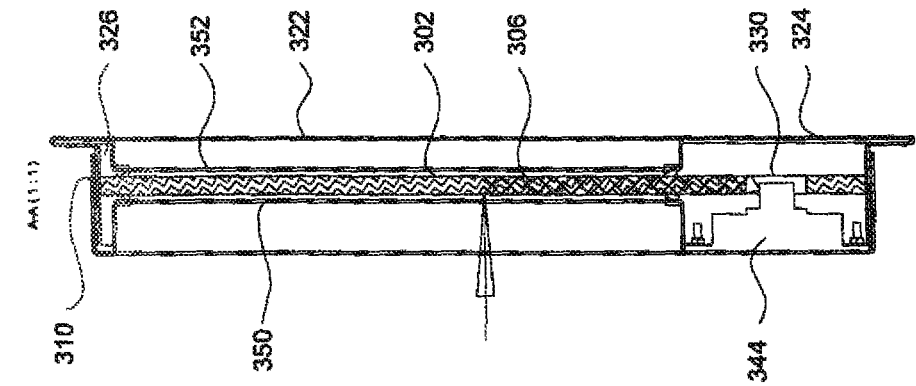
Figure 17:
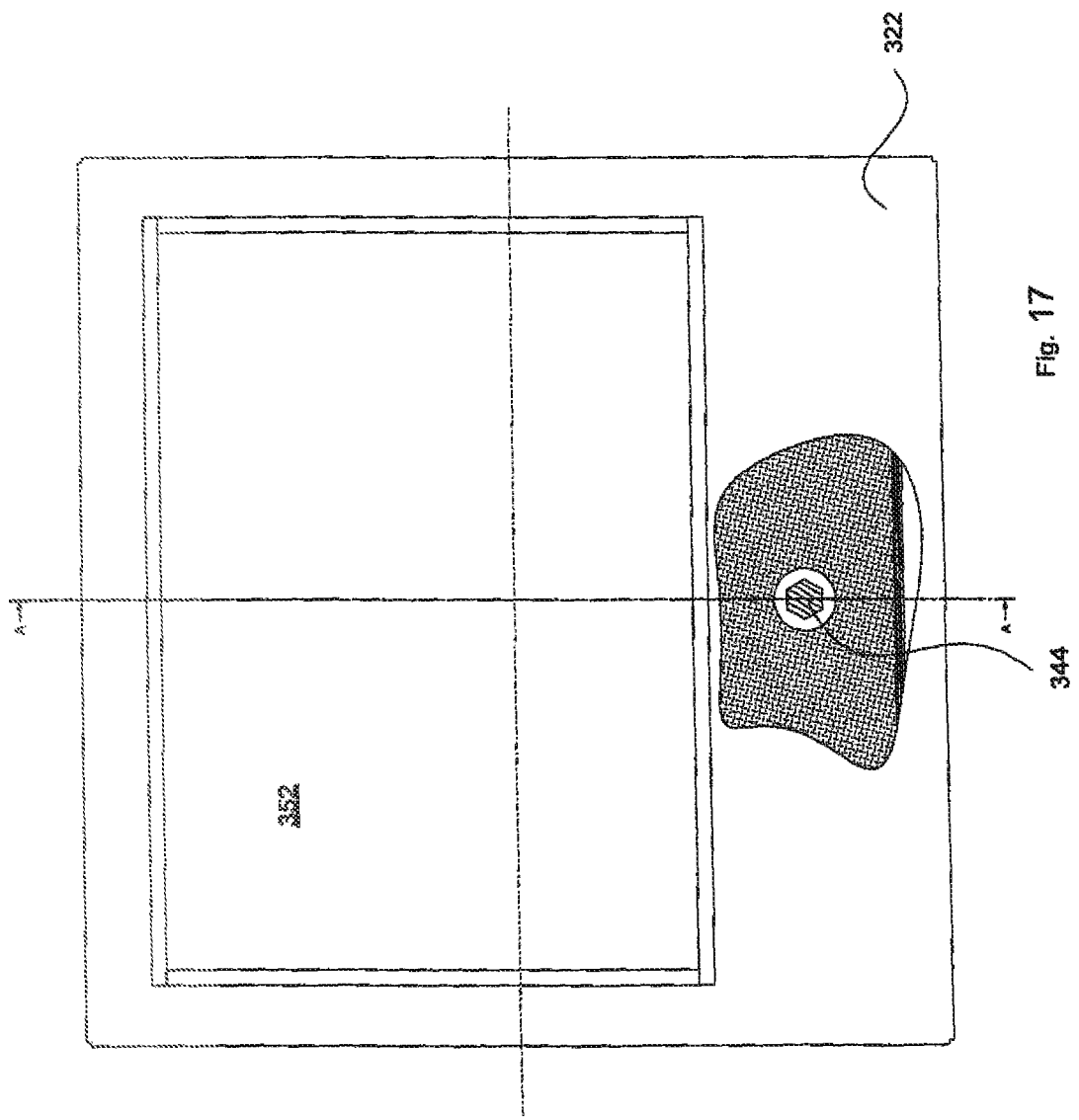

FIG. 13 shows a front view of a further embodiment variant of the assembly of a radiation protection window with frame, FIG. 14 shows an illustration of the assembly of FIG. 13 along the line A-A, FIG. 15 shows an illustration of the assembly of FIG. 13 along the line B-B, FIG. 16 shows an illustration of the assembly of FIG. 13 along the line C-C, FIG. 17 shows a front view of a further embodiment variant of the assembly of a radiation protection window with frame, and FIG. 18 shows an illustration of the assembly of FIG. 17 along the line A-A.

Figure 1:
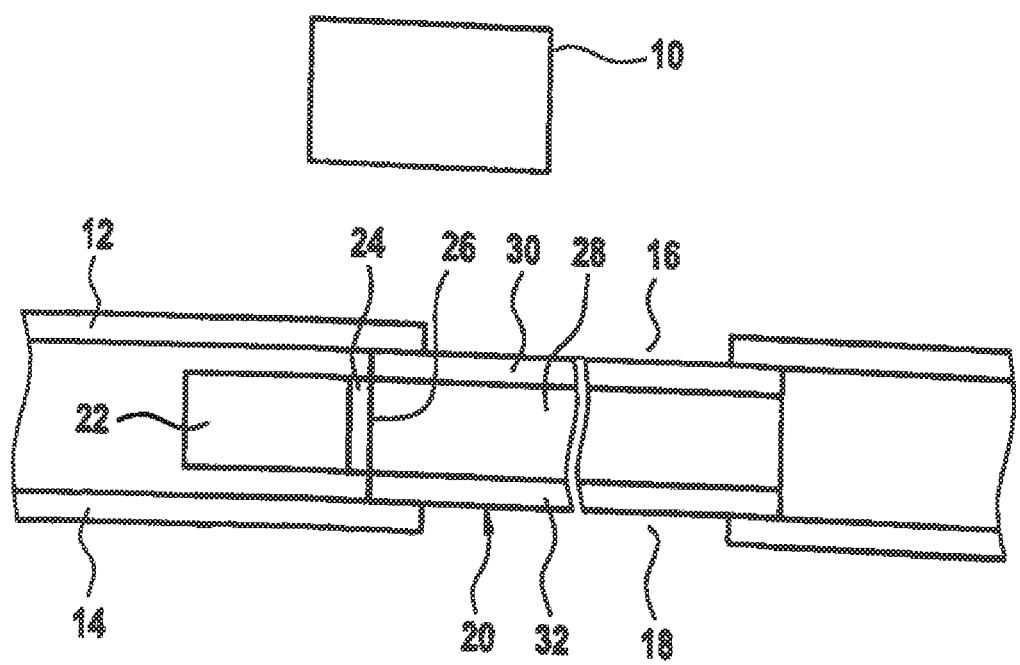
FIG. 1 shows a section of a shielding enclosure.

FIG. 1 shows a section of a shielding enclosure (protective device) of a protective wall system that screens off an area in which is arranged a radiation source 10 that emits hazardous radiation, in particular radiation in the wavelength region between 350 nm and 1800 nm, preferably laser radiation in the near infrared region to process objects that are located within the shielding enclosure.

The protective wall system of the embodiment example comprises walls 12, 14 that are arranged spaced apart from each other. Between the walls 12, 14 may be arranged sensors or detecting devices for the detection of penetrating radiation to shut down the radiation source 10 as soon as incident radiation destroys the inner wall 12. In this regard we refer to technologies, as they are disclosed in particular in DE-B-10 2006 026 555 or DE-U-20 2007 012 255, whereby these disclosures are expressly referenced. A corresponding sensor is schematically shown in FIG. 7.

For the purpose of being able to visually monitor the area shielded by the wall system, each of the walls 12, 14 is provided with one opening 16, 18, each of which is sealed by an at least semi-transparent pane system 20, which according to the invention is embodied as an active window. This means that in the event of the incidence of radiation, the laser source 10 is switched off automatically to rule out any danger to personnel.

The active window in the embodiment example comprises the pane system 20 as well as one sensor 22, with a reception area 24 that is directed towards a section 26 of the circumferential edge of the pane system 20 and in the embodiment example is in contact with the latter.

Naturally the sensor 22, i.e. its reception area 24, may also be arranged at some distance to the pane system 20 or be connected to the latter via a radiation wave-guide.

The pane system 20 of the embodiment example consists of an inner pane 28—referred to as first element—which is radiation conducting. On its side facing the radiation source, the pane 28 is covered by an element 130—referred to as second element—which at least partially absorbs or reflects the emitted radiation and is embodied as filter 30 or reflector. In the following, the second element 130 is in a simplifying manner referred to as filter 30, irrespectively of whether it absorbs or reflects rays. The same is true for a third element 32, which covers the outside of the pane 28 as eye protection.

When radiation such as laser radiation is incident upon the pane system 20, the inner filter 30 is at least partially destroyed which results in the generation of scattered radiation, which enters into the pane 20, where it is guided through scattering and/or total reflection to the sensor 22 so that it becomes detectable, which results in the radiation source 10 being switched off by circuitry connected to the sensor 22. Consequently the radiation can not destroy the pane system 20 to a degree that would endanger personnel located outside of the wall system.

The scattering of radiation in the pane 20 is caused in particular by nano-particles present in the pane or by other scattering points in the pane material.

As mentioned before, the pane system 20 in the embodiment example consist of three panes, i.e. the inner light-conducting first pane element 28 and the outer filters 30, 32 or filter panes, resulting in a sandwich layout. However, even embodiments with only one of the filters 30 or 32 or none of the filters 30, 32 are still within the scope of the invention.

In this case, the pane 28 should comprise at least on its outside, preferably both on its outside and inside, a radiation-absorbing or radiation-reflecting layer to be able to also fulfill the function of the filters 30, 32.

Independently hereof, the material of the filters 30, 32 or the layers must be tuned to the wavelengths of the emitted radiation, so that the latter is absorbed or reflected, and consequently in the event of direct incidence of radiation upon the layer or filter 30 on the radiation-source facing side, the layer or filter is destroyed. This may occur via melting, burning, or bursting. As a result radiation reaches the light-conducting middle pane 28 and is guided to the edges to be received by the sensor 22.

Thereupon the outer layer or the outer filter 32 must provide protection until the radiation source has been shut down. This naturally also applies to the outer wall 14.

For the realization of the invention it is essential to use at least one semitransparent element, which is arranged in an opening of a protective device and which guides incident radiation within the element by scattering and/or total reflection in such a way that the radiation reaches a sensor that with its reception region is arranged in the circumferential edge region of the semitransparent element and upon detection of the radiation shuts down the radiation source.

The scope of the invention is not limited to a wall system as described above. Rather, the invention's teaching is suitable for the sealing of any type of opening in shielding walls, whereby it should be ensured that radiation incident directly upon the pane can not endanger personnel, but that as a result of conduction of radiation within the pane to a sensor the radiation source can be shut down immediately.

The two-dimensional extent of the active window can be that of a wall closing the protected area, whereby the active window is accommodated in a frame.

In this regard it should be mentioned that the active window should be accommodated light-tight in a protective wall or a frame to prevent scattered light from reaching the sensor directly.

In the following, the invention's teaching will be explained again with the help of FIGS. 2 to 6, in particular using the example of a laser protection window.

Figure 2:
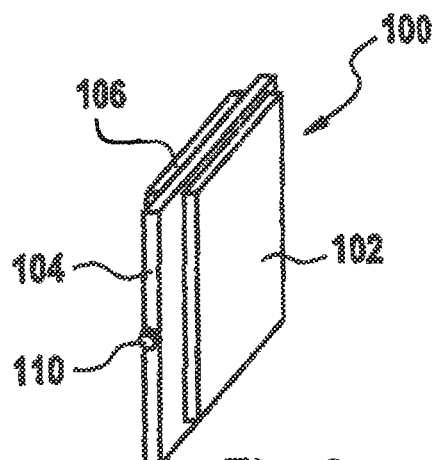
FIG. 2 shows a schematic illustration of a radiation protection window.

FIG. 2 illustrates an active laser protection window 100 that consists of three panes 102, 104, 106. The outer panes 102, 106 are laser protection panes LSS-1, LSS-2, whereas the middle pane 104 is a so-called light-guide pane LLS.

The outer panes 102, 106 are laser protective filters, which are approved as such pursuant to the current effective standard (EN 207). Large size laser protection filters are also referred to as laser protective panels or laser protective windows.

According to the above-mentioned standard, these filters are only approved for a particular maximum exposure (protection level) and time (t=10 s). These filters can only handle for fractions of a second any direct exposure to a focussed high-power laser. If the incident radiation is diffused and/or scattered, this endurance time will be longer. Consequently corresponding filters can only be used as observation windows for low laser outputs.

The light-guiding pane 104 consists of plastic and preferably of acrylic glass. In this, the corresponding plastic has the characteristic property that any light coupled in, e.g. at the edges, will be distributed uniformly across its surface. This effect is due to light-scattering nano-particles, which are introduced into the plastic already at the time of smelting.

The characteristics of corresponding plastics are utilized in accordance with the invention, in particular by employing this effect in reverse, i.e. radiation incident upon the plane surface is scattered by the particles and passed on to the edges.

In the embodiment example, the laser protection pane 102 faces a laser source whereas the laser protection pane 106 faces the observer. Associated with at least one edge of the middle pane 104 is a sensor 110, as was explained above. The sensor 110 may be of the type as it is disclosed in DE-B-10 2006 026 555 or DE-U-20 2007 012 255. Any characteristic features to be found in these applications should be considered disclosed in the present application and consequently as having been filed as characteristic features.

Figure 3:
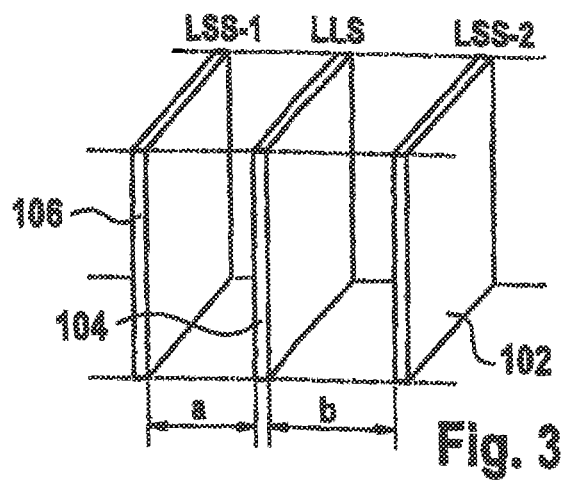
FIG. 3 shows a further embodiment of a radiation protection window.

FIG. 3 schematically illustrates that different from the illustration in FIG. 2, the panes 102, 104, 106 can also be arranged spaced apart, i.e. that the pane 102 and 106 are arranged at a distance to the inner pane 104 facilitating the light-conduction or that only the radiation facing pane 106 or only the pane 102 facing away from the radiation source is arranged spaced apart from the inner pane 104.

When laser radiation reaches the inner laser protection pane 102, which absorbs the laser radiation and consequently is matched to the radiation's wavelength, the laser protection pane 102 is destroyed, i.e. it melts, burns, or bursts. Consequently the laser radiation reaches the light-conducting plastic pane 102 and is conducted to the edge, so that the sensor 110 is able to detect the laser radiation and shut down the laser radiation source.

As illustrated in FIGS. 2 and 4-6, the corresponding sensor 110 preferably is arranged in the centre area of a longitudinal edge of the light-guiding pane 104, whereby it may be in direct contact to the edge or may be located at some distance to the longitudinal edge.

Since the light-conducting plastic only reflects part of the laser radiation in a lateral direction, radiation penetrating through the pane 104 is absorbed by the outer light protective pane 106 or alternatively is reflected, so that an observer on the outside will be protected until the laser has safely been shut down.

The laser protective panes 102, 106 should be precisely matched to the wavelength of the employed laser system.

The monitoring sensor 110 must meet the requirements for category III or IV, i.e. the safety requirements for detectors for the protection of life and limb.

In addition, the active laser protection window 100 must be installed light-tight in a laser protection wall or a laser protection device or in a frame to keep scattered light, e.g. sunlight away from the sensor 100, since the latter would otherwise be triggered.

FIGS. 5 and 6 illustrate that the interior laser protection pane 102 is suitable for absorbing laser radiation without being destroyed. FIG. 5 shows direct laser radiation incident upon the laser protective pane 102, resulting in it being destroyed. This is indicated by the corresponding symbol. If however only scattered light is incident upon the inner laser protective pane 102, then this is absorbed by the laser protective pane 102 (see symbol) without any destruction occurring. This ensures that no radiation reaches the sensor 110 and consequently the laser is not switched off. The same applies to a reflecting variant of the laser protective pane 102. This will only be destroyed if an intensity limit is exceeded; up to this limit the radiation is reflected.

According to the invention it is intended that the employed sensor(s) 22, 110 not only monitor the active window, i.e. the laser protection pane 20, 100, but also the space between the walls 14, 16 of the protective wall system 18 or of the protective device. This becomes possible if—in accordance with the illustration of FIG. 1 or the embodiment variant of FIG. 11—the protective pane 20, 100 is positioned and fixed between the walls 12, 14 without a frame, so that consequently the sensors 22, 110 are able to detect not only radiation emerging from the laser protection pane 20, 100, but also radiation penetrating into the interstice between the walls 12, 14, i.e. after piercing the inner wall 12. FIGS. 8 and 9 illustrate examples of sensor arrangements that facilitate a monitoring of this type.

FIG. 8 illustrates purely schematically a wall 200 of a protective device that comprises two spaced-apart walls, as they are schematically illustrated in FIG. 1.

The wall 200 comprises openings that are present in the respective walls and are sealed by an active window 202. The window 202 is arranged without frame between the walls so that one or several sensor(s) can detect outside the window 202 both the radiation conducted along the active window 202 and the radiation penetrating between the walls of the wall 200.

FIG. 8 is meant to illustrate that a sensor 204, which is arranged along an extension of a diagonal 206 of the rectangular-shaped window 202, can monitor both the window 202 and the space between the walls, since the window 202 does not create any shading since it is light-conducting. Consequently the sensor 204 is also able to detect radiation penetrating into the interstice between the walls into an area 208, which penetrates from the side of the window 202 that from the viewpoint of the sensor 204 is the side facing away.

Another preferred arrangement of a sensor is indicated by the dashed-line representation in FIG. 8. Consequently, a sensor 210 in particular also can be arranged along a longitudinal edge of the window 202.

For the purpose of facilitating a more reliable or possibly redundant monitoring of both the interstice between the walls of the wall 200 of the protective device or shielding enclosure as well as of the active window, in particular with respect to attenuation of the light conduction by the window 202, FIG. 9 illustrates that it is intended that along an extension of a diagonal 212 of the protective window 202, sensors 214, 216 be arranged diametrically opposed relative to the window. Alternatively or additionally sensors 218, 220 may be arranged at opposing longitudinal edges of the protective window 202.

In particular it is intended that the active window 20, 100, 102 be arranged without a frame between the walls 12, 14 of the protective wall system, but the scope of the invention's teaching also includes the alternative, in which the protective window 202 is surrounded by a frame 222, which is inserted into the wall 200 or is arranged onto the outer side of one of the outer walls, as is illustrated in FIG. 12. In this, the frame 222, i.e. its members, can exhibit a U-shape in a cross-sectional view.

Irrespective of the particular lay-out it is intended that both the protective window 202 and the interstice between the frame 222 and the window 202 be monitored by first sensors 224, 226, that are diametrically opposed to each other along an extension of a diagonal 228 of the protective window 202. If the window does not create any shading it is also possible to use only one sensor.

Alternatively a sensor 227 can be arranged in a through-opening of the window 202, so that both the window 202 as well as the space between the window 202 and the frame 222 can be monitored.

The interstice between the walls 12, 14 outside of the frame 202 is monitored by at least two second sensors 230, 232, which are arranged along an extension of the diagonal 234 of the frame 222, so that any radiation penetration into the interstice between the walls 12, 14 of the wall 200 can not be shaded by it.

FIG. 11 purely schematically illustrates that the protective window 202 can be arranged between the walls 12, 14 without a frame, i.e. the edge of the window 202 extends between the walls 12, 14, without a frame being necessary. For mounting purposes, the walls 12, 14 comprise edges 236, 238, 240, 241, between which the pane 202 is fixed, preferably in a clamping manner. For this purpose, sealing agents may additionally be introduced between the edges 236, 238, 240, 241 and the pane 202. It is further possible for angled segments to extend from the edges 236, 238, 240, 241 or from other areas of the walls 12, 14 whereby the segments extend along sections of edges of the pane 202.

FIG. 11 also purely schematically illustrates a sensor 242 that is used to monitor both the pane 202 as well as the interstice between the walls 12, 14.

If the protective pane 202 is accommodated in the frame 222, the area between the pane 202 and the frame 222 can be secured by one or several sensor(s) monitoring the interstice between the walls 12, 14, in particular if the frame 222 is arranged on the inner or outer wall 12, 14 in such a way that it extends in areas, in which the interstice between the walls 12, 14 is monitored, as is illustrated purely schematically in FIG. 12. In this it is irrelevant whether the frame 222 is arranged on the inner wall 12 or on the outer wall 14. For example, if the radiation penetrates the inner wall 12 in the region of the frame 222, it will be detected by the sensor 242. If the frame 222 was arranged on the outer surface of the inner wall 14, radiation penetrating into the interstice between the walls 12, 14 can be detected even if the frame 222 is not monitored separately.

Independently hereof, one receiving element of the sensor 244 must be located within the frame 222 to monitor the pane 202.

In order to minimize the number of sensor, it is possible to use a sensor arrangement corresponding to the one of FIG. 12, for example a sensor monitoring the pane 212 is arranged along a longitudinal edge or along a diagonal of the pane 202 and that sensors monitoring the interstice of the wall system are arranged diametrically opposed to each other along a diagonal of the frame 222, as is schematically illustrated in FIG. 10.

Another option is to arrange the frame 222 between the walls 12, 14. Window 202 and frame 222 on the one hand and the interstice between the walls on the other hand must be monitored separately.

FIG. 7 shows the example of a sensor that may be employed when applying the invention's teaching and that is described in detail in DE-U-20 2007 012 255.

FIG. 7 shows a section of a wall system 318 of a protective device or shielding enclosure comprising two spaced-apart walls 314, 316, as was explained above. For the detection of the penetration of a continuous or pulsed radiation, in particular laser radiation 312 from the protective wall system, and thus for monitoring of at least a partial volume of the interstice between the walls 314, 316, is provided a transmitter/receiver unit 328 that comprises several receivers 322, which are arranged on the surface of a cylinder 330 extending into the interstice 320 and are concentrically surrounded by several transmitters 332 arranged in a circle. This transmitter/receiver unit 328 should be referred to as sensor or detector unit.

The detecting unit 328 is connected to an evaluating circuit 324, which can be arranged on the outer surface of the outer wall 316, for example. But it is also possible to arrange the evaluating circuit 324 in the interstice 320, in particular in an area between the walls 314, 316 that extends in a corner region of a wall formed by the walls 314, 316 of the protective device or shielding enclosure. Correspondingly, a terminal lead extends between the detection unit 320 and the evaluating circuit 324 within the interior space 320. The evaluating circuit 324 is arranged in a housing 336.

As mentioned above, the transmitters 332 are arranged in a circle and concentrically surround the receivers 322, whereby each transmitter 332 is assigned to one receiver 322.

The receivers 322 are arranged in a plane that extends in parallel at a distance relative to a plane in which the transmitters 332 are provided. Further, the transmitters 332 possess characteristic beam emissions 340 that extend in a cone shape and extend fundamentally perpendicular relative to the wall element 316. The receivers 322 possess receiving patterns that are oriented fundamentally in parallel to the limiting wall 316. The transmitters 332 may emit radiation in a modulated pattern. If the receivers 322 detect radiation in which the modulation pattern is disturbed more than a predetermined value, then this is recognized by the evaluating unit 324, resulting in a shut-down of the radiation source.

Other detecting units may be employed as well. It is essential that hazardous radiation such as laser radiation penetrating into the interstice between the walls 316, 318 can be detected so that following such a detection the laser source can be shut down.

FIGS. 13 to 18 show further preferred embodiment variants of protective windows with frames, which can be inserted into openings of a shielding enclosure that comprises two spaced apart walls, whereby the interstice between these is monitored for the ingress of radiation. In this regard we refer to the above explanations.

The embodiment variants of FIGS. 13 to 16 are meant to illustrate again that in principle one sensor 344 is sufficient to monitor both an active pane 302 as well as the void between the pane 302 and a frame 322, irrespective of the particular area where laser radiation is incident or penetrates.

In the embodiment example, the pane 302 is mounted between inner edges (not referenced in more detail) of frame members 324, 326 of the frame 322, whereby each frame member 324, 326 exhibits a rectangular cross-section. In the embodiment example the sensor 344, which fundamentally corresponds in function and design to that of FIG. 7, is arranged in the upper cross member 322, which extends along the longer edge of the active window 302.

In the embodiment example laser radiation 300 penetrates through the interior side of the lower cross member 324. This generates scattered radiation 304, which is conducted via the active window, i.e. the radiation-conducting pane 302, to the sensor 344 where it is detected. Radiation reflected within the pane 302 carries the reference label 306.

A corresponding protective window is connected to an inner and outer wall 214 of a protective wall system of an above-described type, in particular via a circumferential flange 328 as is schematically illustrated.

As is illustrated in FIGS. 13 and 15, the sensor is connected via cables 346, which are running through the cross member 326, to a terminal 348, via which a connection to an evaluation circuit is achieved.

FIGS. 17 and 18 show an alternative embodiment variant that allows monitoring of the frame and the protective pane with a single sensor, whereby identical elements carry equal reference labels.

Differing from the embodiment example of FIGS. 13 to 16, the pane 302 extends across the entire inner surface spanned by the frame 322, so that the circumferential edge 310 of the pane 302 rests on the interior sides of the members 324, 326 of the frame 322. The receiving element of the sensor 334 engages into an opening 330 located in the disk 302. As a result, radiation 306 conducted through the pane 302 can be reliably detected, independent of the location where the radiation penetrates into the frame 322 and reaches the pane 302.

In accordance with the embodiment examples of FIGS. 2 to 6, the pane is covered by a light-absorbing or reflecting second element 350 that extends on the radiation-facing side and a third element 352 on the radiation-far side outside of the mounting of the pane 302, in order to absorb or reflect radiation to the required degree, as was explained above.

The invention claimed is:

1. A device for detecting laser radiation from a radiation source, said device comprising:
   a semi-transparent and radiation-conducting first element having a wafer-like construction;
   a protective device having two spaced-apart walls and openings through the walls;
   wherein said first element is disposed within the protective device;
   wherein said first element seals the openings in the protective device;
   wherein said first element has a through opening; and wherein a radiation sensor comprising a radiation receiving area is disposed in said through opening;

wherein the radiation sensor is configured so that the radiation receiving area receives radiation conducted through the first element and radiation penetrating the protective device from outside of the first element.

2. The device according to claim 1, wherein the sensor comprises:
   a plurality of receivers arranged on the circumference of a tubular jacket; and
   a plurality of transmitters arranged on a circle, and surrounding the receivers concentrically,
   wherein radiation incident upon the first element, and radiation penetrating into the protective device outside the first element, are detected.

3. The device according to claim 1, wherein the first element comprises plastic that contains scattering points for radiation penetrating into the first element.

4. The device according to claim 3, wherein the scattering points are formed by nano-particles.

5. The device according to claim 1, wherein the first element on a side facing away from the radiation source comprises a radiation-absorbing or a radiation-reflecting material, or wherein a radiation-absorbing or beam-reflecting third element is associated with the first element, wherein the third element is connected to the first element, or arranged at a distance.

6. The device according to claim 1, wherein the first element comprises two layers, or two partial panes, resting upon each other along a two-dimensional contact area, wherein one of the layers or partial panes comprises nano-particles forming scattering points, and the other one is entirely or substantially free of scattering points.

7. The device according to claim 1, wherein the first element is installed in the protective device, or in a frame, in a light-tight manner.

8. The device according to claim 1,
   wherein the first element is a pane accommodated in a frame,
   wherein an edge of the pane is in contact with an inner surface of the frame,
   wherein the inner surface of the frame extends perpendicularly to a plane defined by the pane, and
   wherein the sensor is arranged directly in a recess of the pane.

9. The device according to claim 1, further comprising a second element extending along the outside of the first element.

10. The device according to claim 9, wherein the second element is a radiation-absorbing element or a radiation-reflecting element;
    wherein the second element extends on the side of the first element upon which radiation is incident; and
    wherein the second element is a layer of the first element, or is connected to the first element, or is arranged spaced apart from the first element.

11. The device according to claim 9, wherein the second element is a radiation-absorbing element.

12. The device according to claim 1, wherein the protective device is a shielding enclosure of a protective wall system.

13. The device according to claim 1, wherein the laser radiation is in the infrared region.

14. A method for detecting hazardous radiation generated by a radiation source, in an area that is shielded by a protective wall system, the method comprising:
    providing a protective wall system having two spaced-apart walls and an opening through the walls;
    sealing the opening in the protective wall system using a semi-transparent pane comprising a sensor arranged in an edge region of the pane;
    detecting the hazardous radiation conducted across the pane from the radiation source in the direction of a sensor using the sensor, whereupon the sensor switches off the radiation source;
    wherein the material of the pane, or the material of an element associated with the pane on the side facing the radiation source, scatters the hazardous radiation; and
    wherein the sensor monitors the hazardous radiation conducted through the pane and hazardous radiation penetrating into the protective wall system outside of the pane.

15. The method according to claim 14, wherein the protective wall system and the pane are monitored by at least two sensors arranged on the extensions of a diagonal of the pane, or in the longitudinal edge region of the pane.

16. The method according to claim 14, wherein the pane comprises a first layer with particles that form scattering points, and a second layer that is fundamentally free of scattering points, wherein radiation reaching the pane via the first layer, and radiation penetrating into the interstice between the walls via the second layer, is detected by the sensor.

17. The method according to claim 16, wherein the air gap is filled using an adhesive material with a refractive index that is lower than that of the pane.

18. The method according to claim 16, wherein the particles are nono-particles.

19. The method according to claim 14, wherein the pane comprises a first pane element, and a radiation-absorbing or radiation-reflecting second pane element which extends spaced apart to the first element forming an air gap;
    wherein radiation incident upon the pane via the first pane element, and radiation penetrating into the interstice between the walls via the air gap, is detected by the sensor.

20. The method according to claim 14, wherein the hazardous radiation is laser radiation.

21. The method according to claim 14, wherein the pane comprises a first pane element and a radiation-absorbing or radiation-reflecting second pane element;
    wherein the second pane element is spaced apart from the first element by an air gap; and
    wherein radiation incident upon the first pane element, and radiation penetrating into the interstice between the walls via the air gap, is detected by the sensor.

* * * * *